(12) United States Patent
Inamoto et al.

(10) Patent No.: US 7,456,382 B2
(45) Date of Patent: Nov. 25, 2008

(54) LOAD SENSOR, METHOD OF DETECTING LOAD AND PEDESTRIAN PROTECTION SYSTEM

(75) Inventors: Takashi Inamoto, Nagoya (JP); Koji Ohtaka, Anjo (JP); Motomi Iyoda, Seto (JP); Yujiro Miyata, Kariya (JP); Ryotaro Kachu, Nishikamo-gun (JP); Hiroyuki Takahashi, Nishikamo-gun (JP)

(73) Assignee: Denso Corporation, Kariya (JP)

( * ) Notice: Subject to any disclaimer, the term of this patent is extended or adjusted under 35 U.S.C. 154(b) by 60 days.

(21) Appl. No.: 11/260,679

(22) Filed: Oct. 28, 2005

(65) Prior Publication Data

US 2006/0091299 A1 May 4, 2006

(30) Foreign Application Priority Data

Oct. 28, 2004 (JP) .............................. 2004-314239

(51) Int. Cl.
*G06M 7/00* (2006.01)
*H03F 3/08* (2006.01)
*H03G 3/20* (2006.01)
*G08B 13/18* (2006.01)

(52) U.S. Cl. ............ 250/221; 250/214 A; 250/214 AG; 340/555

(58) Field of Classification Search ................. 250/215, 250/216, 221, 227.14, 227.15, 227.18, 214 R, 250/214 A, 214 LA, 214 AG, 214 DC; 385/5, 385/12, 13, 122; 342/21, 72, 70, 71; 340/555–557
See application file for complete search history.

(56) References Cited

U.S. PATENT DOCUMENTS

| 4,830,461 A * | 5/1989 | Ishiharada et al. ............. 385/13 |
| 5,600,133 A * | 2/1997 | Spillman, Jr. ........... 250/227.14 |
| 5,658,011 A * | 8/1997 | Byon .......................... 280/735 |
| 6,739,177 B2 | 5/2004 | Sato et al. |
| 7,098,445 B2 * | 8/2006 | Ishihara ................. 250/227.14 |
| 2004/0068357 A1 * | 4/2004 | Kiribayashi .................. 701/45 |

FOREIGN PATENT DOCUMENTS

JP A-6-300691 10/1994

* cited by examiner

*Primary Examiner*—Kevin Pyo
*Assistant Examiner*—Don Williams
(74) *Attorney, Agent, or Firm*—Posz Law Group, PLC

(57) ABSTRACT

A load sensor includes a optical fiber sensor that provides output analog signals in response to shocks of various magnitudes caused by hits by a vehicle on various objects, two or more amplifiers each of which approximates a non linear function of the analog signals and a unit that converts the linear functions into digital data. Therefore, each analog signal either in a lower magnitude range or a higher magnitude range can be amplified by one of the amplifiers that has a more suitable gain, so that the magnitude of the shock can be accurately converted into digital data for a pedestrian protection airbag system.

8 Claims, 5 Drawing Sheets

LOAD SENSOR, METHOD OF DETECTING LOAD AND PEDESTRIAN PROTECTION SYSTEM

CROSS REFERENCE TO RELATED APPLICATION

The present application is based on and claims priority from Japanese Patent Application 2004-314239, filed Oct. 28, 2004, the contents of which are incorporated herein by reference.

BACKGROUND OF THE INVENTION

1. Field of the Invention

The present invention relates to a load sensor, a method of detecting a load and a pedestrian protection system of a vehicle that employs a load sensor and a method of detecting a load.

2. Description of the Related Art

A pedestrian protection system for a vehicle usually includes an optical fiber sensor and an object examining ECU (electronic control unit). The optical fiber sensor includes an LED (light emitting diode), a photo diode and an optical fiber. The optical fiber is disposed at a front bumper of a vehicle to conduct the light of the LED to the photo diode.

If the front bumper hits an object, the optical fiber is crushed. Consequently, the rate of the light conduction loss in the optical fiber drawn from the LED to the photo diode changes, and the output current of the photo diode changes. The output current is converted into a voltage signal, which is converted into digital data. The digital data are inputted into the object examining ECU, which examines if the hit object is a pedestrian or not. If it is a pedestrian, the object examining ECU operates a pedestrian protection system, such as a pedestrian protecting airbag system.

However, the rate of the light conduction loss of the optical fiber is not proportional to the magnitude of the load that crushes the optical fiber. In other words, the magnitude of the load is not a linear function of the rate of the light conduction loss. Accordingly, it is difficult to detect an accurate magnitude of load or to discriminate a pedestrian from others with a single amplifier that has only one gain for voltage signals inputted thereto.

U.S. Pat. No. 6,739,177B2 discloses a gas sensor in which an arrangement for accurately amplifying non-linear voltage using a map. However, it is necessary to have extra means and software for map matching, which raises the cost of the load sensor.

SUMMARY OF THE INVENTION

Therefore, an object of the invention is to provide an inexpensive and accurate load sensor.

According to a main aspect of the invention, a load sensor includes first means for providing one of output signals in response to a shock caused by a hit on an object, second means for providing a plurality of linear functions by approximating various output analog signals of said first means corresponding to shocks of various magnitudes and third means for providing digital data that correspond to the one of output signals from one of the linear functions. In the above load sensor, the second means is preferably a plurality of amplifiers each of which has a prescribed gain. The first means may include a light emitting element, a light sensing element and an optical fiber connecting the light emitting element and the light sensing element. The first means may also include fourth means for defomring the optical fiber in response to the shocks.

Another object of the invention is to provide a pedestrian protection system.

This system includes the above described load sensor, an object examining unit for providing an output signal when discriminating a pedestrian according to the digital data of the load sensor and an air bag control unit for providing an airbag operating signal when receiving the output signal from the object examining unit.

In the above pedestrian protection system, the second means may include a lower load amplifier and a higher load amplifier.

Another object of the invention is to provide a method of accurately detecting a load by an inexpensive load sensor.

The method of detecting a load caused by hitting an object includes a first step of providing output analog signals in response to shocks of various magnitudes caused by hits on various objects, a second step of approximating a non linear function of the analog signals of the magnitudes of shocks by a plurality of linear functions and a third step of providing digital data converted from the linear function.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A pedestrian protection system according to a preferred embodiment of the present invention with a load sensor and a method for detecting load using the load sensor will be described with reference to the appended drawings.

Figure 1:
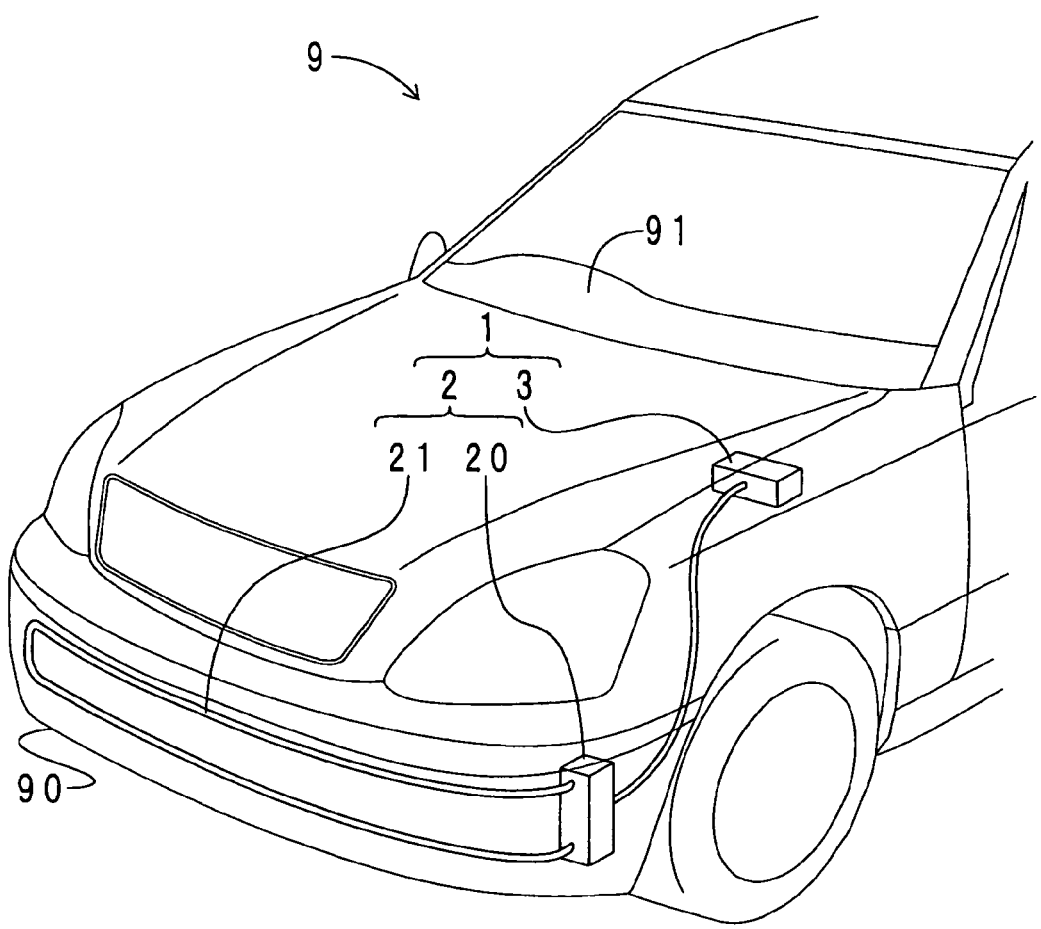
FIG. 1 is a perspective view illustrating a vehicle front portion in which a pedestrian protection system according to a preferred embodiment of the invention is mounted.

As shown in FIG. 1, the pedestrian protection system 1 includes a load sensor 2, a touch sensor (not shown), an air bag ECU 3. The air bag ECU 3 includes an object examining ECU.

The load sensor 2 includes a sensor ECU 20 and an optical fiber 21. The load sensor 2 is embedded into a front bumper 90 of a vehicle 9. The optical fiber 21 is made of a light conductive resin and put around the front portion of the front bumper 90 from one side thereof to the other side.

The airbag ECU 3 is accommodated in a place above a floor tunnel of the vehicle 9 below the transversely central portion of an instrument panel 91. The airbag ECU 3 and the sensor ECU 20 are connected by a wire harness.

Figure 2:
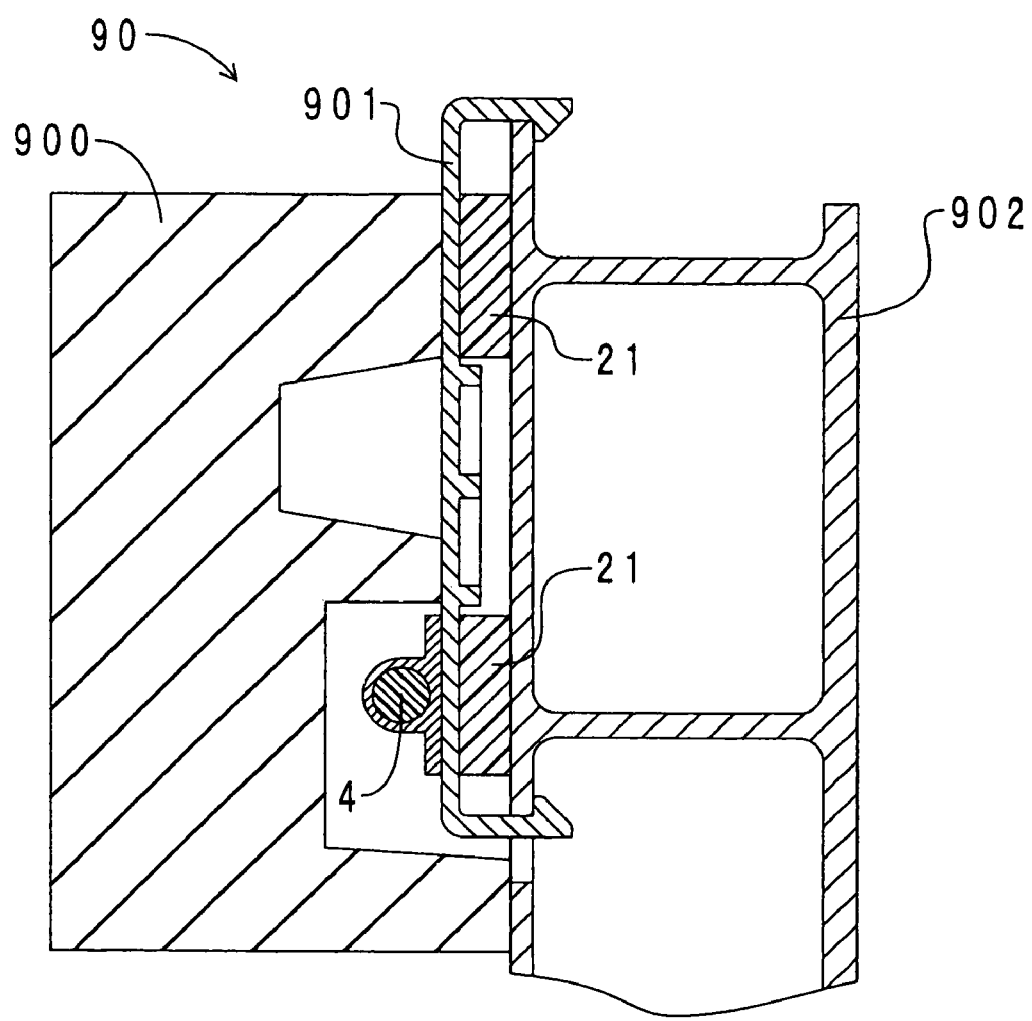
FIG. 2 is a schematic cross-sectional side view of a front bumper of the vehicle shown in FIG. 1 with a load sensor of the pedestrian protection system being mounted therein.

As shown in FIG. 2, the front bumper 90 includes a bumper absorber 900, a load transmission plate 901, a bumper reinforcement member 902 and a bumper cover (not shown). The bumper cover is exposed to the outside in the front of vehicle 9. The bumper absorber 900 is a long plate made of foamed resin and disposed at the back of the bumper cover to extend in the transversal direction of the vehicle.

The load transmission plate 901 is a long plate made of metal and is disposed at the back of the bumper absorber 900 to extend in the transversal direction of the vehicle. A columnar touch sensor 4 is mounted in the space between the load transmission plate 901 and the bumper absorber 900 to extend in the transversal direction of the vehicle. The touch sensor 4 has a long tube that contains four spiral lead wires that are connected to each other like a line drawn with a single stroke. When two lead wires are brought in contact, the touch sensor 4 provides a turn-on signal.

The bumper reinforcement member 902 is also a member made of metal that extends in the transversal direction of the vehicle. The bumper reinforcement member 902 is supported by a front side member (not shown) at the back thereof. The optical fiber 21 is disposed between the reinforcement member 902 and the load transmission plate 901. The sensor ECU 20 is disposed at the left corner of the bumper reinforcement member 92, as shown in FIG. 1.

Figure 3:
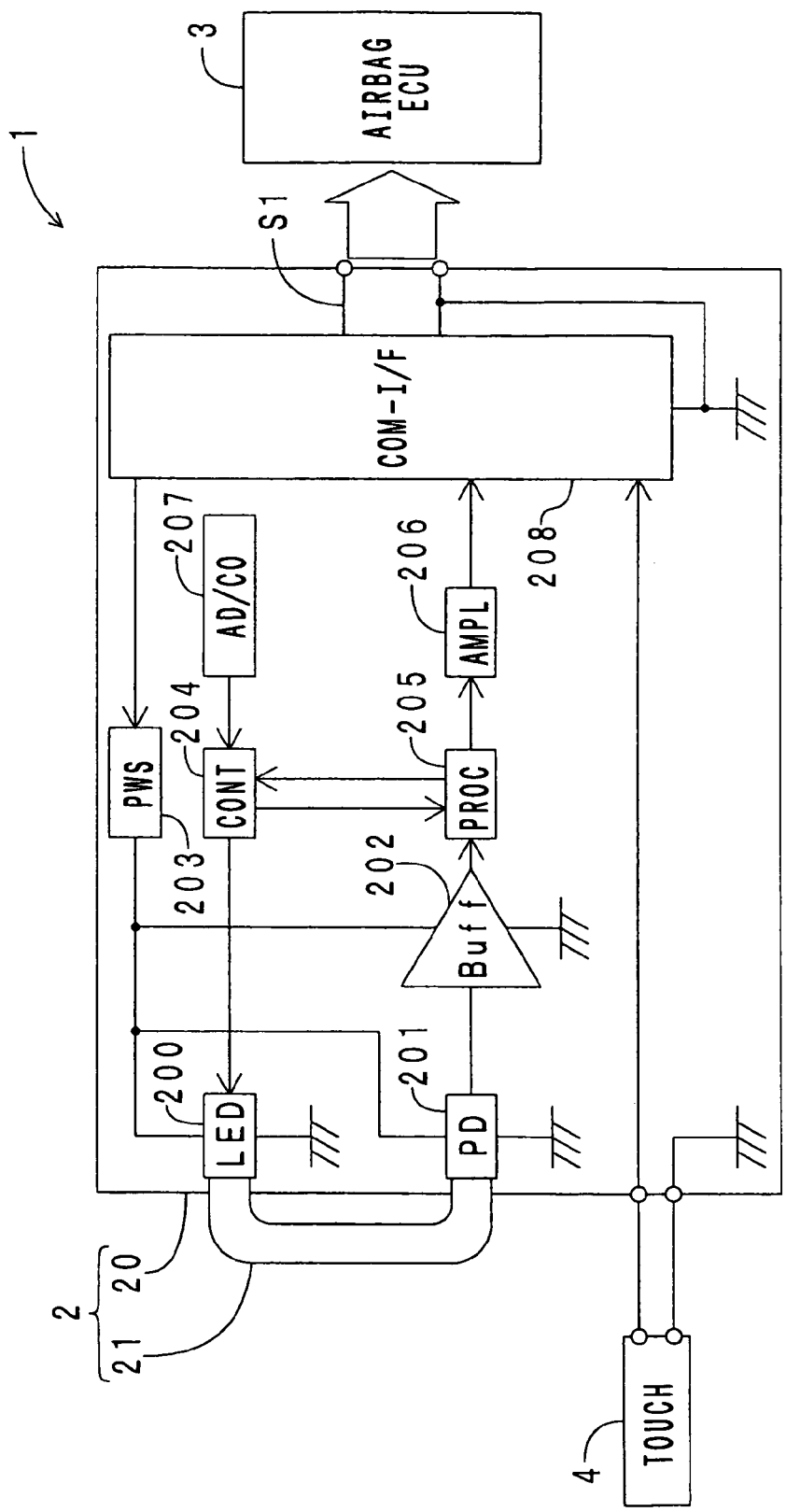
FIG. 3 is a block diagram of the pedestrian protection system.

As shown in FIG. 3, the pedestrian protection system 1 includes the load sensor 2, the touch sensor 4 and the airbag ECU 3. The sensor ECU 20 includes an LED 200, a photo diode 201, a buffer 202, a 5-volt-power source 203, a control unit 204, a processing unit 205, an amplifying unit 206, an adjusting/correcting unit 207 and a communication I/F (interface) 208.

The 5-volt-power source 203 is converted from battery voltage to apply 5-volt constant voltage to the LED 200, the photo diode 201 and the buffer 202. The LED 200 is disposed at one end of the optical fiber 21. The LED 200 supplies the optical fiber 21 with a light of a prescribed wave length (e.g. 650 nm). The photo diode 201 is disposed at the other end of the optical fiber 21. The photo diode 201 receives the light of the LED 200 conducted by the optical fiber 21. The buffer 202 is an operational amplifier. The buffer 202 receives the output voltage of the photo diode 201 and prevents interference of the circuits on the input side with the circuits on the output side. The processing unit 205 is a low-pass filter that has a comparatively large time constant. The amplifying unit 206 amplifies the output voltage of the processing unit 205. The control unit 204 controls the current of the LED 200 so that the output voltage of the photo diode 201 can be kept constant. The adjusting/correcting unit 207 adjusts or corrects the variation of the output signal of the load sensor 2 that is caused in the manufacturing process.

The output voltage of the amplifying unit 206, which is an analog signal, is converted into digital data by the communication I/F 208. These digital data are sent to the airbag ECU 3 via a single communication line S1. The turn-on signal of the touch sensor 4 is also converted into digital data, which are sent to the airbag ECU 3.

If the vehicle 9 hits an object at the bumper cover of the front bumper 90, a shock caused by the hit is transmitted from the bumper cover via the bumper absorber 900 to the touch sensor 4. Accordingly, the touch sensor 4 is crushed so that its round section becomes a flat elliptic section. Consequently, the lead wires of the touch sensor 4 are brought in contact with each other to provide a turn-on signal.

Figure 4:
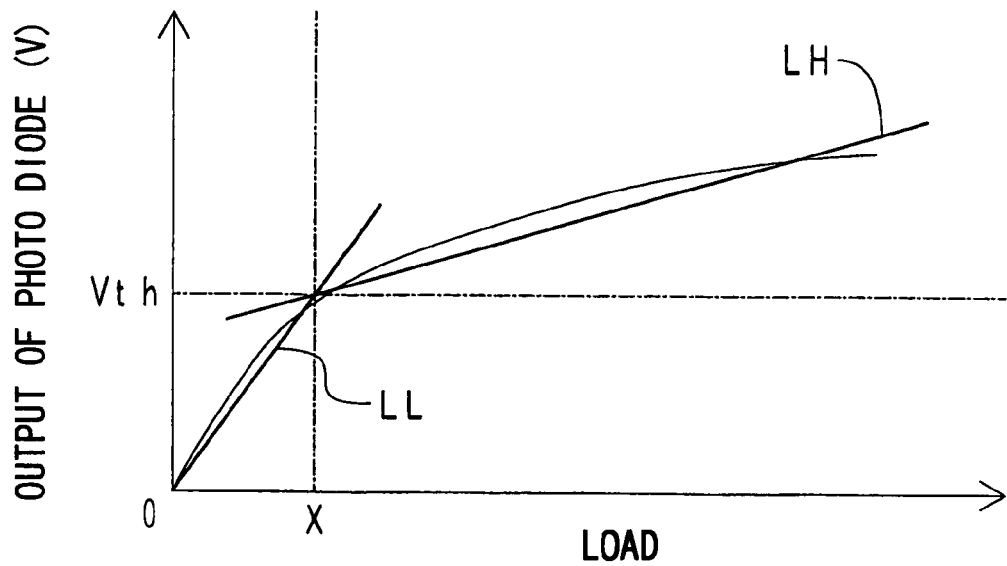
FIG. 4 is a graph showing a relationship between magnitude of load and output voltage of the load sensor.

The shock is also transmitted from the bumper absorber 900 via the load transmission plate 901 to the optical fiber 21. Incidentally, the rigidity of the load transmission plate 901 and the bumper reinforcement member 902 is higher than optical fiber 21. Therefore, the optical fiber 21 is compressed between the load transmission plate 901 and the bumper reinforcement member 902. Accordingly, the section of the optical fiber 21 is deformed from a round shape to a flat elliptic shape, so that the quantity of the light conducted from the LED 200 to the photo diode 201 changes. Consequently, the current passing through the photo diode 201 changes, and the output voltage of the photo diode 201 changes, as shown in FIG. 4.

That is, the output voltage of the photo diode 201 draws a curve with change in the magnitude of the input load (shock) that is applied to the bumper cover. This curve is approximated by two or more straight lines LL and LH as shown in FIG. 4. Incidentally, line LL represents the output voltage of the photo diode 201 at the lower magnitude range of the input load, and line LH represents the output voltage of the photo diode 201 at the higher magnitude range of the input load.

Figure 5:
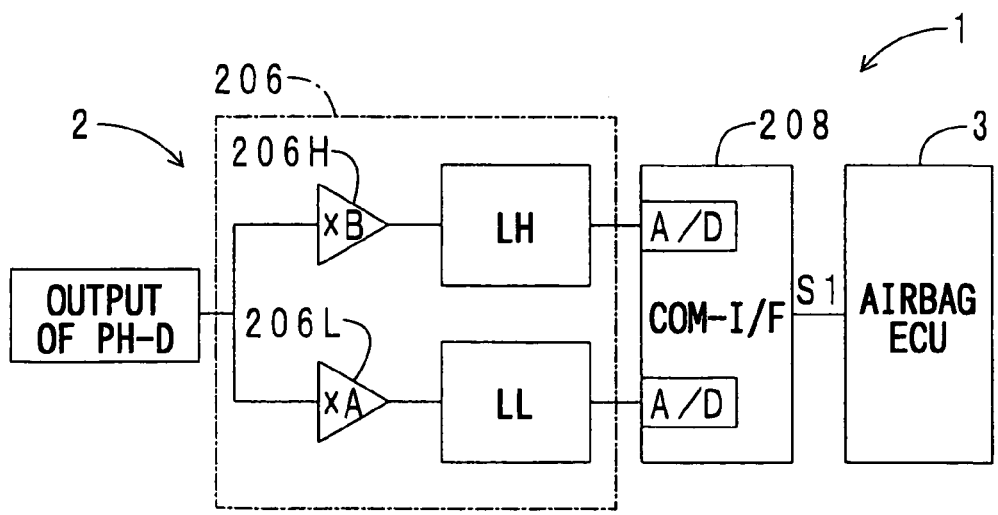
FIG. 5 is a signal processing diagram of the pedestrian protection system.
Figure 6:
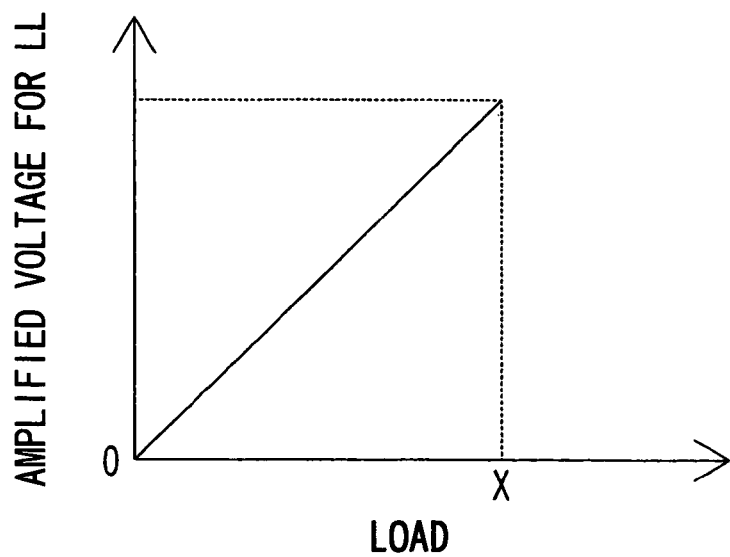
FIG. 6 is a graph showing a relationship between the magnitude of load and the output voltage signal of a lower-load amplifier.
Figure 7:
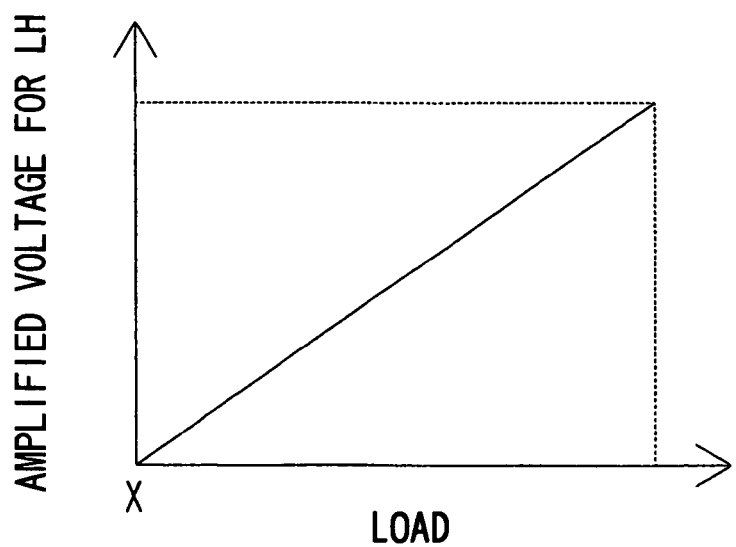
FIG. 7 is a graph showing a relationship between the magnitude of load and the output voltage signal of a higher-load amplifier.

The amplifying unit 206 of the load sensor 2 includes a lower load amplifier 206L and a higher load amplifier 206H, as shown in FIG. 5. The lower load amplifier 206L amplifies the input load signal at a higher gain than the higher load amplifier 206H as shown in FIGS. 6 and 7. The amplifying unit 206 amplifies the input load in the lower magnitude range from zero to X by the lower load amplifier 206L and the input load in the magnitude range higher than X by the higher load amplifier 206H. The amplified voltage of each of the amplifiers 206L, 206H is separately converted into digital data by the communication I/F 208 and sent to the airbag ECU 3 via the communication line S1.

The airbag ECU 3 includes an object examining unit and an airbag driving unit, which are common in this technical field. The object examining unit examines an object by comparing the magnitude of the input load with a threshold voltage.

If the object is presumed to be a pedestrian as a result of the examination while the touch sensor 4 provides a turn-on signal, the driving unit drives an airbag system to inflate the pedestrian protection airbag, which is mounted in a front portion of the vehicle 9.

Thus, the magnitude of load that is detected by the load sensor can be accurately converted into digital data without using additional hardware such as a logarithmic amplifier or soft ware.

In the above described pedestrian protection system, the amplifying unit 206 may be included into the airbag ECU 3 instead of the sensor ECU 20, and the object examining ECU may be separated from the airbag ECU 3.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A load sensor comprising:
    first means for providing an output signal that draws a non-linear input load curve with a change in magnitude of a shock caused by a hit on an object;
    second means including a plurality of amplifiers having respective prescribed gains and being connected with said first means to provide respective linear functions, whereby each of the linear functions corresponds to a portion of the input load curve at a prescribed gain and together with the other linear functions forms an approximation of the input load curve; and third means for converting the linear functions to digital data.

2. The load sensor according to claim 1, wherein said first means comprises a light emitting element, a light sensing element, an optical fiber connecting said light emitting element and said light sensing element, and fourth means for deforming said optical fiber in response to the shock.

3. The load sensor according to claim 1, wherein said third means is for separately receiving and converting each of the linear functions to the digital data.

4. A pedestrian protection system comprising:

a load sensor including first means for providing an output signal that draws an input load curve with change in magnitude of a shock caused by a hit on an object, second means having a plurality of amplifiers having respective prescribed gains and connected with said first means to provide respective linear functions each corresponding to a portion of the input load curve at a prescribed gain thereby approximating the input load curve, and third means for providing digital data that corresponds to the linear functions;

an object examining unit for providing an output signal when discriminating a pedestrian according to the digital data; and an air bag control unit for providing an airbag operating signal when receiving the output signal from said object examining unit.

5. The pedestrian protection system according to claim 4, wherein said second means comprises a lower load amplifier and a higher load amplifier.

6. The pedestrian protection system according to claim 4, further comprising a single communication line for sending the digital data from said third means to said airbag control unit.

7. The pedestrian protection system according to claim 4, wherein said third means is for separately receiving and converting each of the linear functions to the digital data.

8. A method of detecting a load caused by hitting an object comprising:

providing an output analog signal that draws an input load curve with a change in magnitude in response to various shocks caused by object hits;

dividing the input load curve into a plurality of linear portions;

amplifying each of the linear portions at a gain specific to each of the linear portions to approximate the input load curve; and separately converting to digital data each of the amplified linear portions for subsequent digital processing.

* * * * *